(12) United States Patent
Abts et al.

(10) Patent No.: US 8,380,935 B2
(45) Date of Patent: Feb. 19, 2013

(54) ATOMIC MEMORY OPERATION CACHE PROTOCOL WITH OPPORTUNISTIC COMBINING

(75) Inventors: Dennis C. Abts, Eleva, WI (US); Steven L. Scott, Chippewa Falls, WI (US)

(73) Assignee: Cray Inc., Seattle, WA (US)

( * ) Notice: Subject to any disclaimer, the term of this patent is extended or adjusted under 35 U.S.C. 154(b) by 748 days.

(21) Appl. No.: 12/484,165

(22) Filed: Jun. 12, 2009

(65) Prior Publication Data

US 2010/0318747 A1    Dec. 16, 2010

(51) Int. Cl.
*G06F 12/00* (2006.01)
(52) U.S. Cl. .................... 711/144; 711/E12.37
(58) Field of Classification Search .......... 711/E12.37, 711/113–146
See application file for complete search history.

(56) References Cited

U.S. PATENT DOCUMENTS

| | | | |
|---|---|---|---|
| 6,178,481 B1 * | 1/2001 | Krueger et al. | 711/122 |
| 6,775,703 B1 * | 8/2004 | Burns et al. | 709/228 |
| 7,596,571 B2 * | 9/2009 | Sifry | 1/1 |
| 2004/0093463 A1 * | 5/2004 | Shang | 711/113 |
| 2010/0293338 A1 * | 11/2010 | Krishnaprasad et al. | 711/136 |
| 2010/0306448 A1 * | 12/2010 | Chen et al. | 711/103 |

OTHER PUBLICATIONS

Burtinas et al., "NIC-Based Atomic Remote Memory Operations in Myrinet/GM", Feb. 2002, Publisher: Proceedings SAN-1.

* cited by examiner

*Primary Examiner* — Yaima Campos
*Assistant Examiner* — Mehdi Namazi
(74) *Attorney, Agent, or Firm* — Charles A. Lemaire; Jonathan M. Rixen; Lemaire Patent Law Firm, P.L.L.C.

(57) ABSTRACT

An atomic memory operation cache comprises a cache memory operable to cache atomic memory operation data, a write timer, and a cache controller. The cache controller is operable to update main memory with one or more dirty atomic memory operation cache entries stored in the cache memory upon expiration of the write timer, and is further operable to update main memory with one or more dirty atomic memory operation cache entries stored in the cache memory upon eviction of the one or more dirty atomic memory operation cache entries from the cache memory.

20 Claims, 1 Drawing Sheet

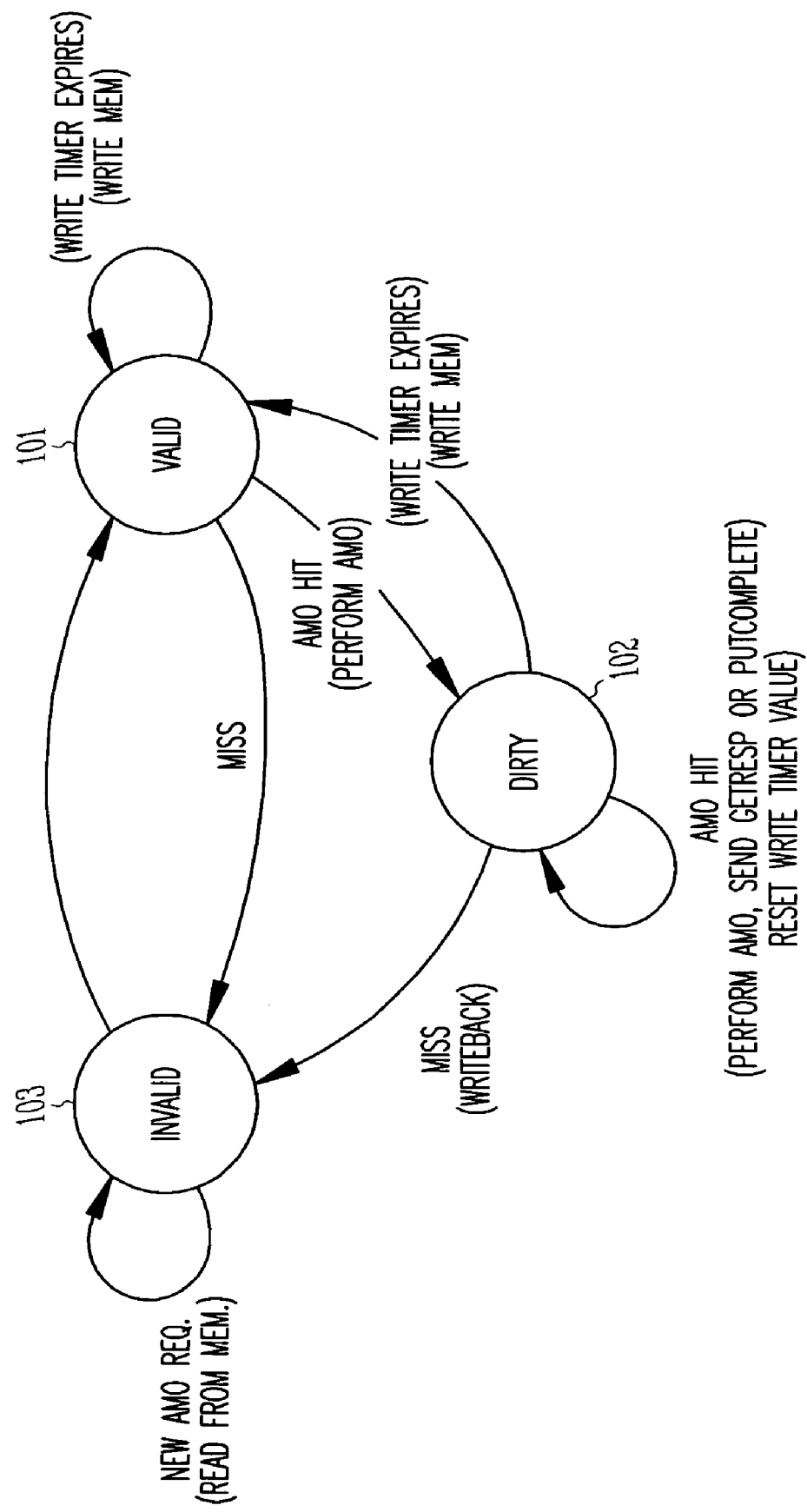

ATOMIC MEMORY OPERATION CACHE PROTOCOL WITH OPPORTUNISTIC COMBINING

FEDERALLY SPONSORED RESEARCH OR DEVELOPMENT

The U.S. Government has a paid-up license in this invention and the right in limited circumstances to require the patent owner to license others on reasonable terms as provided for by the terms of Contact No. MDA904-02-3-0052, awarded by the Maryland Procurement Office.

FIELD OF THE INVENTION

The invention relates generally to computer system instructions, and more specifically to an atomic memory operation cache protocol with opportunistic combining.

BACKGROUND

Most general purpose computer systems are built around a general-purpose processor, which is typically an integrated circuit operable to perform a wide variety of operations useful for executing a wide variety of software. The processor is able to perform a fixed set of instructions, which collectively are known as the instruction set for the processor. A typical instruction set includes a variety of types of instructions, including arithmetic, logic, and data instructions.

In more sophisticated computer systems, multiple processors are used, and one or more processors runs software that is operable to assign tasks to other processors or to split up a task so that it can be worked on by multiple processors at the same time. In such systems, the data being worked on is typically stored in memory that is either centralized, or is split up among the different processors working on a task.

Instructions from the instruction set of the computer's processor or processor that are chosen to perform a certain task form a software program that can be executed on the computer system. Typically, the software program is first written in a high-level language such as "C" that is easier for a programmer to understand than the processor's instruction set, and a program called a compiler converts the high-level language program code to processor-specific instructions.

In multiprocessor systems, the programmer or the compiler will usually look for tasks that can be performed in parallel, such as calculations where the data used to perform a first calculation are not dependent on the results of certain other calculations such that the first calculation and other calculations can be performed at the same time. The calculations performed at the same time are said to be performed in parallel, and can result in significantly faster execution of the program. Although some programs such as web browsers and word processors don't consume a high percentage of even a single processor's resources and don't have many operations that can be performed in parallel, other operations such as scientific simulation can often run hundreds or thousands of times faster in computers with thousands of parallel processing nodes available.

The program runs on multiple processors by passing messages between the processors, such as to share the results of calculations, to share data stored in memory, and to configure or report error conditions within the multiprocessor system. Communication between processors is an important part of the efficiency of a multiprocessor system, and becomes increasingly important as the number of processor nodes reaches into the hundreds or thousands of processors, and the processor network distance between two processors becomes large.

The speed of a processor or of a group of processors at running a given program is also dictated by the instructions the processor is able to execute, and the processor's ability to quickly access the data needed to complete execution of program instructions. Memory speed can therefore be a significant factor in computer performance, and has led to small amounts of relatively fast but expensive memory known as cache being utilized to store copies of data most frequently used while larger but slower memory holds the bulk of program instructions and other data being used by the computer system.

Efficient sharing of memory is also an important part of computer system performance, as various processors in a multiprocessor computer typically exchange data by storing and reading data to shared memory. Ensuring that the data is up-to-date is a significant challenge, as shared data can be changed by other processors, and cached data can be updated in cache and main memory at different times. For example, if a pending write to a memory location has been issued but has not yet completed when a processor reads the memory location, the outdated data might be read.

It is desirable to provide memory system that ensures the accessibility and integrity of data in a multiprocessor computer system.

SUMMARY

One example embodiment of the invention comprises an atomic memory operation (AMO) cache comprises a cache memory operable to cache atomic memory operation data, a write timer, and a cache controller. The cache controller is operable to update main memory with one or more dirty atomic memory operation cache entries stored in the cache memory upon expiration of the write timer, and is further operable to update main memory with one or more dirty atomic memory operation cache entries stored in the cache memory upon eviction of the one or more dirty atomic memory operation cache entries from the cache memory.

BRIEF DESCRIPTION OF THE FIGURES

FIG. 1 shows a state diagram of an atomic memory operation cache controller, consistent with an example embodiment of the invention.

DETAILED DESCRIPTION

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to define these example embodiments.

The following detailed description does not, therefore, limit the scope of the invention, which is defined only by the appended claims.

In an example embodiment of the invention, an atomic memory operation cache comprises a cache memory operable to cache atomic memory operation data, a write timer, and a cache controller. The cache controller is operable to update main memory with one or more dirty atomic memory operation cache entries stored in the cache memory upon expiration of the write timer, and is further operable to update main memory with one or more dirty atomic memory operation cache entries stored in the cache memory upon eviction of the one or more dirty atomic memory operation cache entries from the cache memory. The atomic memory operation cache reduces memory latency for cached elements reused in atomic memory operations, and the write-back features ensure timely consistency of cached data with main memory.

Some processor operations are considered atomic, in that their occurrence can be considered a single event to the rest of the processor. More specifically, an atomic operation does not halfway complete, but either completes successfully or does not complete. This is important in a processor to ensure the validity of data, such as where multiple threads or operations can be operating on the same data type at the same time. For example, if two separate processes intend to read the same memory location, increment the value, and write the updated value back to memory, both processes may read the memory value before it is written back to memory. When the processes write the data, the second process to write the data will be writing a value that is out of date, as it does not reflect the result of the previously completed read and increment operation.

This problem can be managed using various mechanisms to make such operations atomic, such that the operation locks the data until the operation is complete or otherwise operates as an atomic operation and does not appear to the rest of the processor to comprise separate read and increment steps. This ensures that the data is not modified or used for other instructions while the atomic instruction completes, preserving the validity of the instruction result.

Conventional microprocessors do not provide fine-grained locking instructions for efficient read-modify-write memory operations to enable atomic memory operations. A typical microprocessor will provide coarse-grain locks at the cache line (e.g. 64 byte) granularity. This coarse-grain unnecessarily consumes memory bandwidth when the lock itself is a subset of the cache line. Further, a conventional microprocessor will provide only limited operations on these memory locations, such as load-lock and store-condition, and fetch-and-increment. These limitations are a severe impediment for scalable multiprocessor application that perform many lock operations on a shared data structure. One conventional solution to this problem is to simply perform cache line granularity locks, which provides the basic functional requirement at the expense of performance.

In one example embodiment of the invention, efficient synchronization in a scalable multiprocessor depends on these atomic memory operations being integrated in the network interface chip (NIC) that interfaces the microprocessor to the interconnect over which many processors cooperate.

An example embodiment of the invention described here allows high-bandwidth, fine-grained atomic memory operations, including: atomic-add, atomic-and-xor, atomic-fetch-add, atomic-compare-swap. We describe a memory consistency protocol that allows a small cache to be kept coherent with the main memory associated with the cached location. The write-through cache can be implemented over a non-coherent IO link (e.g. non-coherent HyperTransport). A timer associated with each cache entry allows temporal reuse, which is effective at hiding main memory latency for heavily-contended locks in a multiprocessor application.

The AMO cache in this example is a fully-associative set of eight 64-bit words. A coherence protocol is used to maintain consistency of data stored in the AMO cache with copies of the same data stored in main memory. The cache entries are physically tagged with address bits address[39:2] that are used to match the cache contents with the requesting address. The AMO cache state is defined by the set {Invalid, Valid, and Dirty}, and operations on the AMO cache are defined by the state diagram of FIG. 1.

The AMO cache will lazily propagate new writes to memory if there is no contention for the lock. A configurable write timer allows the write-policy to be tuned. When the timer expires, the new AMO result is propagated to main memory. In this way, we reduce the write bandwidth to main memory by opportunistically combining multiple AMO operations while still ensuring that all writes are propagated to main memory with low latency, as defined by the write timer.

Referring to FIG. 1, operation of the AMO cache is as follows. An AMO request arrives from the interconnection network and compares the AMO cache tag with the requestor's address. If it is a hit (match) to a valid AMO cache entry at 101, then the AMO is performed and the result stored in the cache data. On an AMO miss (no match), the AMO control unit will schedule a writeback operation if the cache was in the Dirty state 102, updating main memory with the up-to-date AMO cache data. Then, it will update the AMO cache tag to invalid at 103 and schedule a memory read operation to fill the AMO cache. When the read operation returns, the cache fill operation transitions from Invalid to Valid as shown at 101. The original AMO request is replayed as shown at 101 and the AMO is performed, and the result of the operation is written to main memory via a memory write operation. If a subsequent AMO operation arrives and finds the cache in the Valid state, the atomic operation is performed and the AMO cache transitions to the Dirty state, but the result of the operation is not written to main memory. Thus, the write to main memory is only performed by the first update, and all subsequent AMO operations will update main memory once the write timer expires or until an AMO cache miss triggers a writeback operation.

When the write timer expires, the AMO cache data is propagated to main memory via a write operation, and the state transitions from Dirty to Valid as shown at 102-101. This allows write bandwidth to be conserved for heavily-contended locks, avoiding needlessly sending updates to main memory that are immediately replaced by subsequent write to the AMO cache, while at the same time reducing latency for producer-consumer applications where the consumer process (spin-waiting on the lock variable in the local processor cache) is eagerly awaiting the producer to signal a synchronizing event via the lock variable.

Requests that miss in the Dirty state perform a writeback operation to update main memory with the AMO cache data prior to performing the memory read to fill the AMO cache with the newly requested data.

An AMO operation can hit in the AMO cache when there is an exact match of the AMO cache tag. There are three different cases to handle on an exact match: 1) an AMO operation, 2) a read operation to the lock variable stored in the AMO cache, and 3) a write operation to the lock variable stored in the AMO cache. In the first case, a subsequent AMO operation that hits in the AMO cache simply uses the cache data and stores the result back in the AMO cache data. The second case is a read operation for more than the 64-bit word stored in the cache. In this case, we first writeback the AMO cache data (if the state is Dirty) and then send a subsequent read operation to retrieve the desired words from main memory. This ensures consistency between the AMO cache data and the main memory. In the third case, all writes that are an exact or partial match with the AMO cache tag must first flush the AMO cache data (by performing a writeback of the cache data) and only after the AMO cache data is globally visible is the subsequent write operation performed. This ensures that writes to the same address are serialized or performed in the proper order.

The AMO cache protocol with opportunistic combining provides for low latency atomic memory operations, since only the first operation to a cached line must wait for the read access latency. This reduces the amount of write bandwidth to main memory consumed by allowing temporal reuse of AMO results, and provides a consistent view of main memory though an AMO cache coherence protocol. A rich suite of operations can therefore be performed on main memory more efficiently, including:

Fetch-Add (atomically add the operand to the contents of the memory location, and return the prior value), Fetch-Compare-Swap (atomically compare the comparand with the contents of the memory location and, if equal, exchange the swaperand with the contents of the memory location; return the prior value of the memory location), Atomic-And-Xor (atomically perform a logical AND with the first 64-bit operand, and then perform an XOR with the result and the second operand), Fetch-And-Xor (atomically perform a logical AND of the contents of the memory location with the first 64-bit operand, then perform a logical XOR with the result and the second operand; return the prior value of memory location), and Atomic-Add (atomically perform an arithmetic sum with the operand, and the contents of the memory location).

Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

We claim:

1. An atomic memory operation cache comprising:
a cache memory operable to cache atomic memory operation data, wherein the cache memory includes a plurality of entries including a first entry;
a write timer; and
a cache controller operable to read atomic memory operation data from a main memory into the first entry in the cache memory,
to write to the main memory with the data from the first entry upon a first update of the data in the first entry,
to indicate the first entry as "dirty" but not write to the main memory upon a second update of the data in the first entry,
to write to the main memory with the data from the first entry upon an atomic memory operation miss occurring after the second update of the data in the first entry, and
to update the main memory with one or more dirty atomic memory operation cache entries stored in the cache memory upon expiration of the write timer.

2. The atomic memory operation cache of claim 1, the cache controller further operable to update main memory with one or more dirty atomic memory operation cache entries stored in the cache memory upon eviction of the one or more dirty atomic memory operation cache entries from the cache memory.

3. The atomic memory operation cache of claim 1, wherein the write timer is reset by an atomic memory cache entry becoming dirty.

4. The atomic memory operation cache of claim 1, wherein the write timer comprises a separate timer associated with each cache entry.

5. The atomic memory operation cache of claim 1, the atomic memory operation cache further operable to perform one or more of atomic-add, atomic-and-xor, atomic-fetch-add, atomic-compare-swap instructions on cached data.

6. A method of operating an atomic memory operation cache, the method comprising:
caching atomic memory operation data in a cache memory, wherein the caching includes:
reading atomic memory operation data from a main memory into a first entry in the cache memory,
writing to the main memory with the data from the first entry upon a first update of the data in the first entry,
indicating the first entry as "dirty" but not writing to the main memory upon a second update of the data in the first entry, and
writing to the main memory with the data from the first entry upon an atomic memory operation miss occurring after the second update of the data in the first entry, and
updating the main memory with one or more dirty atomic memory operation cache entries stored in the cache memory upon expiration of a write timer.

7. The method of operating an atomic memory operation cache of claim 6, further comprising updating main memory with one or more dirty atomic memory operation cache entries stored in the cache memory upon eviction of the one or more dirty atomic memory operation cache entries from the cache memory.

8. The method of operating an atomic memory operation cache of claim 6, further comprising resetting the write timer when an atomic memory cache entry becomes dirty.

9. The method of operating an atomic memory operation cache of claim 6, wherein the write timer comprises a separate timer associated with each cache entry.

10. The method of operating an atomic memory operation cache of claim 6, further comprising one or more of atomic-add, atomic-and-xor, atomic-fetch-add, atomic-compare-swap instructions on cached data.

11. A method of reducing atomic memory operation memory latency in a system that includes a plurality of processors including a first processor having a first network interface coupled to an interconnect over which the plurality of processors cooperate, the method comprising:
integrating atomic memory operations in the first network interface;
caching atomic memory operation data in a cache memory, wherein the caching includes:
reading atomic memory operation data from a main memory into a first entry in the cache memory,
writing to the main memory with the data from the first entry upon a first update of the data in the first entry, indicating the first entry as "dirty" but not writing to the main memory upon a second update of the data in the first entry, and writing to the main memory with the data from the first entry upon an atomic memory operation miss occurring after the second update of the data in the first entry, and updating the main memory with one or more dirty atomic memory operation cache entries stored in the cache memory upon expiration of a write timer.

12. The method of reducing atomic memory operation memory latency of claim 11, further comprising updating main memory with one or more dirty atomic memory operation cache entries stored in the cache memory upon eviction of the one or more dirty atomic memory operation cache entries from the cache memory.

13. The method of reducing atomic memory operation memory latency of claim 11, wherein the write timer comprises a separate timer associated with each cache entry.

14. The method of reducing atomic memory operation memory latency of claim 11, further comprising resetting the write timer when an atomic memory cache entry becomes dirty.

15. The method of reducing atomic memory operation memory latency of claim 11, wherein the caching of the atomic memory operation data in the cache memory includes:

executing a first atomic instruction selected from a set consisting of (an atomic-add instruction, an atomic-and-xor instruction, an atomic-fetch-add instruction, and an atomic-compare-swap instruction) on the atomic memory operation data from the main memory, writing a result of the first atomic instruction back into main memory, placing the atomic memory operation data in an entry in the cache memory, and marking the entry in the cache memory as valid;

executing a subsequent plurality of atomic instructions selected from the set consisting of (the atomic-add instruction, the atomic-and-xor instruction, the atomic-fetch-add instruction, and the atomic-compare-swap instruction) on the atomic memory operation data in the entry in the cache memory to create modified data and marking the entry in the cache memory as dirty; and after the executing of a last one of the subsequent plurality of atomic instructions on the atomic memory operation data in the entry in the cache memory, restarting the write timer, and wherein the updating of the main memory includes: after the expiration of the write timer, then writing the modified data back to the main memory and marking the entry as invalid.

16. A scalable multiprocessor computer system, comprising:

a plurality of processors that cooperate over an interconnect, wherein the plurality of processors includes a first processor, wherein the first processor has a first network interface that is interfaced to the interconnect, and wherein atomic memory operations are integrated in the network interface;

a main memory accessible by the first processor;

a cache memory operable to cache atomic memory operation data, wherein the cache memory is operatively coupled to the first processor, and wherein the cache memory includes a plurality of entries including a first entry and a second entry;

a write timer; and a cache controller operable to read atomic memory operation data from the main memory into the first entry in the cache memory, to write to the main memory with the data from the first entry upon a first update of the data in the first entry, to indicate the first entry as "dirty" but not write to the main memory upon a second update of the data in the first entry, to write to the main memory with the data from the first entry upon an atomic memory operation miss occurring after the second update of the data in the first entry, and to update the main memory with one or more dirty atomic memory operation cache entries stored in the cache memory upon expiration of the write timer.

17. The computer system of claim 16, the cache controller further operable to update main memory with one or more dirty atomic memory operation cache entries stored in the cache memory upon eviction of the one or more dirty atomic memory operation cache entries from the cache memory.

18. The computer system of claim 16, wherein the write timer is reset by an atomic memory cache entry becoming dirty.

19. The computer system of claim 16, wherein the write timer comprises a separate timer associated with each cache entry.

20. The computer system of claim 16, the atomic memory operation cache further operable to perform one or more of atomic-add, atomic-and-xor, atomic-fetch-add, atomic-compare-swap instructions on cached data.

\* \* \* \* \*